United States Patent [19]
Leimbach

[11] 3,742,722
[45] July 3, 1973

[54] THERMOSTATIC EXPANSION VALVE FOR REFRIGERATION SYSTEMS

[75] Inventor: John George Leimbach, Crestwood, Mo.

[73] Assignee: Spartan Valve Company, St. Louis, Mo.

[22] Filed: Feb. 8, 1972

[21] Appl. No.: 224,442

[52] U.S. Cl.................. 62/225, 62/223, 62/224, 236/92 B
[51] Int. Cl.......................................... F25b 41/04
[58] Field of Search.................... 62/225, 224, 223; 236/92 B

[56] References Cited
UNITED STATES PATENTS

| | | | |
|---|---|---|---|
| 2,368,592 | 1/1945 | Dillman............................ | 236/92 B |
| 2,409,661 | 10/1946 | Carter................................ | 62/225 |
| 2,786,336 | 3/1957 | Lange............................... | 236/92 B |
| 3,103,795 | 9/1963 | Tilney............................... | 62/225 |

*Primary Examiner*—William J. Wye
*Attorney*—Cohn, Powell & Hind

[57] ABSTRACT

A thermostatic expansion valve for a refrigeration system including a piston movable in a cylindrical chamber formed in the valve body, a first plastic seal carried by the piston and slidably yet sealably engaging the chamber wall, a second plastic seal carried by the piston and selectively engaging a valve seat to close the valve port, the piston having opposed first and second pressure surfaces, the first pressure surface being defined by the valve port and subjected to the pressure in the valve passage at one side of the valve port tending to move the piston toward the open position, and means subjecting the second pressure surface to the same pressure exerted on the first pressure surface and tending to urge the piston toward the closed position. The piston is provided with a nose, constituting at least a part of the first pressure surface, which extends beyond the second plastic seal and through the valve port, the nose being selectively shaped and contoured to vary the nominal capacity of the valve. The piston nose is detachably connected to the piston so that noses of different shapes and contours can be selectively attached to change such nominal valve capacity. The piston assembly includes adjacent first and second piston bodies, the first plastic seal being located against one end of the first piston body, and the second plastic seal being sandwiched between the other end of the first piston body and the second piston body, and the nose being provided with a threaded shank threadedly engaging the first and second piston bodies to clamp the piston bodies and seals together. A push rod extends through a body bore and operatively interconnects a flexible motor element with the valve means for moving the valve means. The body includes a guide portion through which the rod bore extends, the guide portion extending into the valve passage and spaced from the valve means, and being provided with an annular edge about the body bore and push rod. A seal collar of plastic material is slidably yet sealably mounted with a close fit on the push rod between the guide portion and the valve means. A spring about the push rod urges the seal collar against the annular edge to seal the clearance of the body bore between the push rod and the guide portion.

14 Claims, 5 Drawing Figures

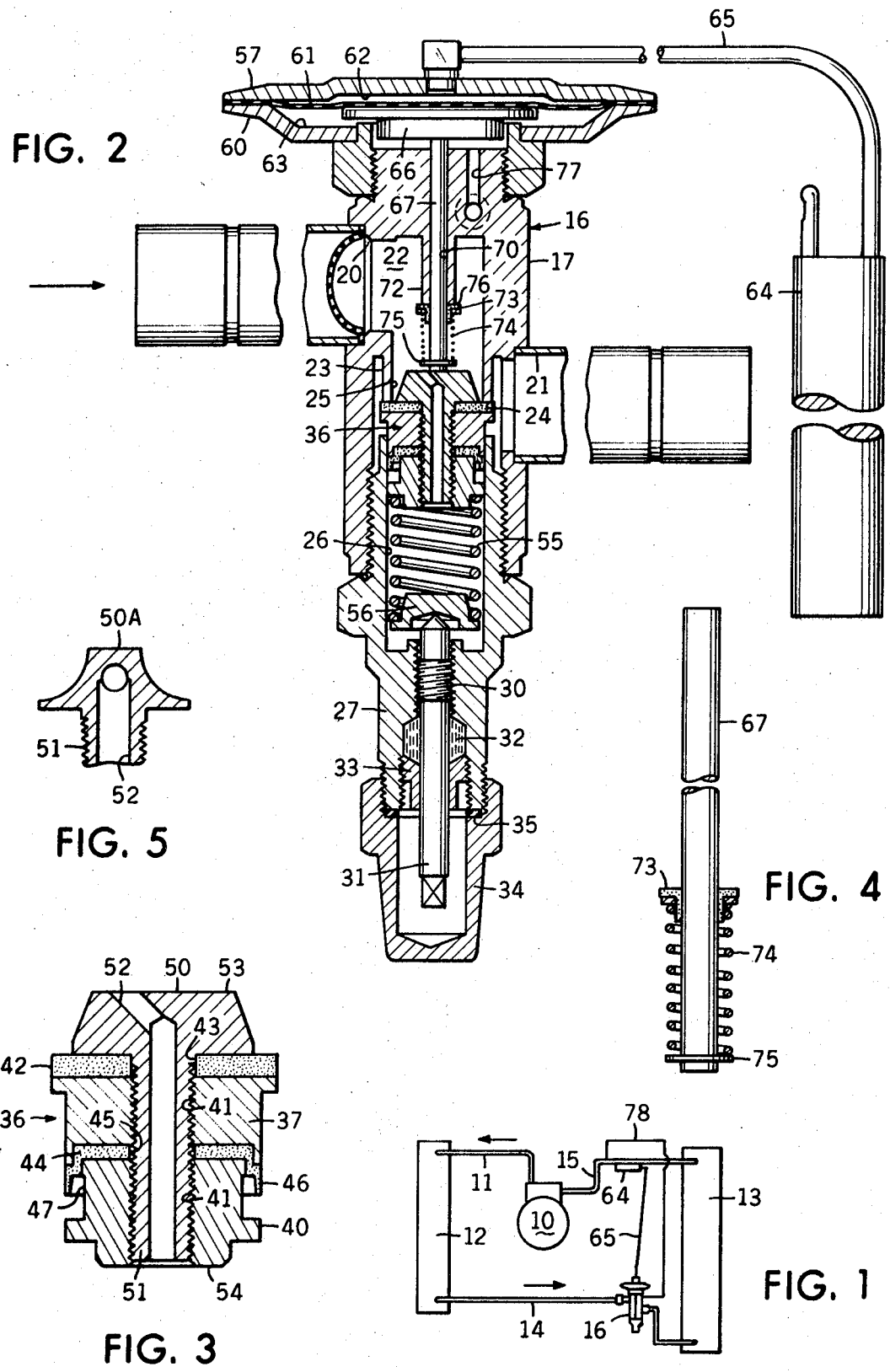

THERMOSTATIC EXPANSION VALVE FOR REFRIGERATION SYSTEMS

BACKGROUND OF THE INVENTION

This invention relates generally to improvements in a thermostatic expansion valve for refrigeration systems, and more particularly to an improved valve piston assembly including the sealing means employed by such piston, and to an improved seal between the actuating push rod and a guide portion of the valve body in which the rod is mounted to prevent venting around the push rod.

Some of the heretofore conventional refrigeration valves employ a sealing means such as an O-ring in the piston assembly which causes for too much friction to allow the valve to be used successfully as a thermostatic expansion valve.

In addition, in those prior expansion valves utilizing a push rod operatively interconnecting the diaphragm of a thermostatic element and the valve piston, appreciable amounts of the high pressure liquid flowing through the valve would vent up around the push rod and expand under the diaphragm, thereby resulting in the possibility that the thermostatic element could become colder than the sensing bulb with possible charge migration or condensation.

The prior expansion valves usually have a piston assembly that is not adaptable for ready modification in order to change the nominal valve capacity, and therefore, such valves usually have a fixed nominal capacity.

SUMMARY OF THE INVENTION

The present thermostatic expansion valve provides a piston assembly that minimizes friction between the piston and the valve body in which it is mounted, and provides an effective seal between the push rod and the guide portion of the body in which the rod is mounted in order to effectively preclude venting of liquid around the rod and into the diaphragm compartment. Moreover, the piston assembly permits modification readily in order to change the nominal valve capacity.

The expansion valve includes a valve means having a piston movable in a cylindrical chamber formed in the valve body. A first plastic seal carried by the piston, slidably yet sealably engages the wall of the cylindrical chamber, and a second plastic seal carried by the piston, selectively engages the valve seat to close the valve port. Opposed first and second pressure surfaces are provided on the piston, the first pressure surface being defined by the valve port and subjected to the pressure in the valve passage at one side of the valve port and tending to move the valve means toward the open position. Means is provided for subjecting the second pressure surface to the same pressure exerted on the first pressure surface, such pressure tending to urge the valve means toward the closed position.

The piston is provided with a nose constituting at least a part of the first pressure surface, the nose extending beyond the second plastic seal and through the valve port. The nose is selectively shaped and contoured to vary the nominal capacity of the valve. Preferably, the piston nose is detachably connected to the piston so that noses of different shapes and contours can be selectively chosen and attached in order to change the nominal valve capacity.

The piston includes adjacent first and second piston bodies, the first plastic seal being located against one end of the first piston body, and the second plastic seal being sandwiched between the other end of the first piston body and the second piston body. The nose is provided with a threaded shank that threadedly engages the first and second piston bodies to clamp the piston bodies and seals together.

The second plastic seal carried by the piston includes a down-turned peripheral flange that sealingly yet slidingly engages the wall of the cylindrical chamber. The flange is constructed so that it is urged inwardly against its inherent spring loading when the flange engages the chamber wall. The second piston body is provided with a peripheral recess extending behind the peripheral flange of the second plastic seal for a pressure compartment. The pressure in the recess urges the seal flange outwardly against the chamber wall.

A push rod extends through a body bore and operatively interconnects the flexible motor element and the valve means for moving the valve means. The body includes a guide portion through which the rod bore extends, the guide portion extending into the valve passage and spaced from the valve means. The guide portion is provided with an annular edge about the body bore and push rod. Slidably and sealably mounted with a close fit on the push rod between the guide portion and valve means, is a seal collar of plastic material. A spring means about the push rod urges the seal collar against the annular edge to seal the clearance of the bore between the push rod and guide portion, and thereby prevent venting of liquid along the push rod and against the flexible motor element.

With this valve assembly, if a pressure drop occurs, such as when a distributor is used, between the valve outlet and the external equalizer connection to the refrigeration system line, the valve remains balanced.

BRIEF DESCRIPTION OF THE DRAWING

FIG. 1 is a diagram showing a refrigeration system and the connection of the thermostatic expansion valve in such system;

FIG. 2 is a cross-sectional view of the thermostatic expansion valve;

FIG. 3 is an enlarged, cross-sectional view of the valve piston;

FIG. 4 is an enlarged, elevational view of the push rod and the sealing means carried by such rod, and FIG. 5 is a fragmentary, enlarged cross-sectional view of a modified valve piston nose.

DESCRIPTION OF THE PREFERRED EMBODIMENTS

Referring now by characters of reference to the drawing, and first to the refrigeration system diagram of FIG. 1, it will be understood that the system includes a compressor 10 connected by line 11 to a condenser 12. An evaporator 13 is connected by line 14 to the outlet of condenser 12, while the outlet of evaporator 13 is connected by line 15 to the compressor 10. A thermostatic expansion valve generally indicated by 16 is connected to the inlet of evaporator 13 in line 14.

The expansion valve 16 includes a valve body 17 having a valve inlet 20 and a valve outlet 21 interconnected by a refrigerant passage 22. Formed internally of valve body 17 is a partition 23 through which the passage 22 extends. The partition 23 includes a valve seat 24 defining a valve port 25.

Formed in the valve body 17 is a substantially cylindrical piston chamber 26 at one side of the valve port 25. The piston chamber 26 is defined by an end body portion 27 in which a threaded bore 30 is provided. Adjustably mounted in the threaded bore 30 is an adjustment stem 31, the stem 31 having one end extending into the piston chamber 26 and an opposite end extending outwardly of the body end portion 27. A seal 32 is located about the stem 31, and is located between the stem 31 and the body end portion 27 to close the piston chamber 26 effectively. A fitting 33 is located over the stem 31, and is threadedly attached to the body end portion 27, the fitting 33 engaging the seal 32 to maintain and compress such seal 32 in place. A closure cap 34 is located over and threadedly attached to the body end portion 27, the cap 34 covering the adjustment stem 31. A gasket 35 is located between the cap 34 and the valve body end 27.

The valve means includes a piston generally indicated by 36, the detailed assembly of the piston 36 being more clearly shown in FIG. 3. This piston 36 includes a first piston body 37 and a second piston body 40, each of which is provided with a threaded bore 41 therethrough. A first plastic seal 42, preferably constructed of Teflon, is located against one end of the first piston body 37, the seal 42 being provided with a hole 43 aligned axially with the threaded bore 41 of the piston body 37. A second plastic seal 44, preferably constructed of Teflon, is located and sandwiched between the opposite end of the first piston body 37 and the second piston body 40. The second plastic seal 44 is provided with a hole 45 that is axially aligned with the threaded bores 41 of the piston bodies 37 and 40.

As is best seen in FIG. 3, the second plastic seal 44 is provided with a down-turned peripheral flange 46 that is adapted to engage slidingly yet sealingly the wall of the cylindrical piston chamber 26. The seal flange 46 is constructed so that it is urged inwardly against its inherent spring loading when the flange 46 engages the chamber wall. The second piston body 40 is provided with a peripheral recess 47 extending behind the peripheral seal flange 46 to form a pressure chamber. The pressure in the recess urges the seal flange 46 outwardly against the chamber wall.

The piston 36 also includes a nose 50 that engages the first plastic seal 42. The nose 50 is of a dimension to be spaced inwardly from the peripheral edge of the first plastic seal 42 so that the nose 50 extends upwardly through the valve port 25. The periphery of the first plastic seal coacts with the valve seat 24 to control flow of the refrigerant through the valve port 25.

The nose 50 includes an elongate threaded shank 51 that extends through the holes 43 and 45 of the first and second plastic seals 42 and 44 respectively, and which is threadedly attached to the first and second piston bodies 37 and 40 in the threaded bores 41. As the threaded nose shank 51 is turned tightly, the piston bodies 37 and 40, and the first and second plastic seals 42 and 44, are clamped tightly together to form a unit assembly.

Formed in the nose 50 and its threaded shank 51 is a vent hole 52 that places the piston chamber 26 below the piston 36 in communication with the valve passage 22 through the valve port 25, and consequently transmits the inlet pressure to the piston chamber 26.

The piston 36 is provided with opposed first and second pressure surfaces 53 and 54 respectively. More particularly, the first pressure surface 53 is provided by the nose 50 and part of the first plastic seal 42 and is defined by the valve seat 24 and hence by the valve port 25. The first pressure surface 53 is subjected to the pressure existing in the valve passage 22 at the valve inlet 20 and exerted through the valve port 25, the inlet pressure being exerted on the first pressure surface 53 tending to urge the piston 36 toward an open position. The second pressure surface 54 is provided by the opposite side of piston 36 and is defined by the diameter of the cylindrical wall of piston chamber 26 engaged by the peripheral flange 46 of the second plastic seal 44. This second pressure surface 54 partially defines the chamber 26. The opposing pressure exerted on the second pressure surface 54 tends to urge the piston 36 toward a closed position. Preferably, the areas of the opposed pressure surface 53 and 54 are preselected so that the piston 36 is pressure-balanced.

Located within the piston chamber 26 is a compression spring 55, one end of which engages the piston 36, while the other end seats on a spring guide 56, the spring guide 56 being supported on and adjustably located by the adjustment stem 31. The compression spring 55 exerts a predetermined force on the piston 36 tending to move the piston 36 toward a closed position.

Attached to the valve body 17 are a pair of housing plates 57 and 60 that are spaced to provide a pressure chamber therebetween. A flexible diaphragm 61, constituting a flexible motor element, is fixed between the peripheral margins of plates 57 and 60, and extends across the pressure chamber 20 divide the chamber into separate compartments 62 and 63. A bellows can be used in lieu of diaphragm 61, if desired.

A thermal-sensing bulb 64 is connected by tube 65 to the compartment 62. As is best shown in FIG. 1, the bulb 64 is attached and/or located in heat exchange relationship to the outlet of evaporator 13. Therefore, the bulb 64 subjects one side of the diaphragm 61 to a pressure that is a function of the temperature of the refrigerant at the evaporator outlet and tends to move the piston 36 toward an open position as will be explained upon later detailed description of parts.

Located in the compartment 63 and fixed to one side of the diaphragm 61 is a buffer plate 66. A push rod 67 is slidably received and mounted in a bore 70 formed in the valve body 17 and in a guide portion 72 extending into the valve passage 22. The end of the guide portion 72 is spaced above the nose 50 of the piston 36. One end of the push rod 67 engages the buffer plate 66, while the opposite end engages the nose 50 of the piston 36.

The seal collar 73, formed of a plastic material such as Teflon, is slidingly yet sealingly carried by the push rod 67 on that portion of the rod 67 located between the guide portion 72 and the piston nose 50. A compression spring 74 is located over the same portion of the push rod 67, one end of the spring 74 engaging the seal collar 73 and the other end engaging a washer 75 fixed to the end of the push rod 67. The spring 74 tends to urge the seal collar 73 upwardly against an annular edge 76 formed on the end of the guide portion 72 about the bore 70, and thereby effectively seal the clearance between the rod 67 and the guide portion 72. This sealing by the seal collar 73 precludes high pressure liquid from venting up around the push rod 67, and thereby precludes the possibility of the thermostatic element becoming colder than the bulb 64 with possible migration of the charge or condensation which could adversely affect the operation of the expansion valve 16.

The end of the guide portion 72 is countersunk about the bore 70 internally of the annular edge 76 so that during normal motion of the piston 36, the portion of the push rod 67 that engages the guide portion 72 will not rub also on the seal collar 73.

Formed in the valve body 17 is an equalizer passage 77 that communicates with the compartment 63 and communicates by an external tube 78 (FIG. 1) with the outlet of evaporator 13, preferably downstream of the bulb 64, so as to subject the other side of the diaphragm 61 to the pressure of the refrigerant at the evaporator outlet, such pressure tending to move the piston 36 to the closed position.

FIG. 5 illustrates only one of many modified nose constructions that can be effectively utilized with the piston 36. For example, the nose 50A is of a different shape and contour that alters the nominal capacity of the valve 16. The particularly shaped, concave nose 50A when used with Refrigerant 22 will rate at about 70 tons while the relatively blunt nose 50 of FIG. 3 will rate at about 40 tons.

Tests have shown that stable superheat control can be maintained down to a load approximately 1/20th of the maximum rated capacity of the valve.

Because of the particular assembly of the piston 36 with its improved plastic seals 42 and 44, and the improved seal provided by seal collar 73, variations in head or discharge pressure have little or no effect on valve operation. The parts are easy to manufacture and install. This single port, pressure-balanced piston 36 is better than the existing semi-balanced dual port designs both from an operational and a manufacturing standpoint. In addition, the piston 36 can be under or over pressure-balanced to obtain other desired results. This design results in a relatively large capacity valve in a relatively small envelope, and permits a family of valves that can be obtained by merely changing the nose 50. It is also possible to use a larger diameter thermostatic motor element to obtain more capacity through the use of a longer stroke.

With this valve assembly, if a pressure drop occurs, such as when a distributor is used, between the valve outlet and the external equalizer connection to the refrigeration system line, the valve remains balanced.

This expansion valve has applications on conventional air conditioners, chillers and the like. The smooth control and pressure-balanced port design will allow the valve to be used on air-cooled condenser systems where head pressure controls are not utilized. The valve will control over a wide range of net available pressure drops brought about by variations in outdoor ambient temperature.

We claim as our invention:

1. In a refrigeration system having a compressor, condenser and evaporator operatively interconnected:
   a. an expansion valve comprising a body having an inlet and an outlet interconnected by a passage for flow therethrough, the outlet being connected to a line leading to the evaporator, and the inlet being connected to the high pressure side of the system,
   b. a valve seat defining a valve port in the passage,
   c. the valve body being provided with a cylindrical chamber at one side of the valve port,
   d. a valve means movably mounted in the chamber for movement toward or away from the valve seat to control flow through the valve port,
   e. a spring means tending to urge the valve means toward a closed position,
   f. a flexible motor element carried by the body and operatively connected to the valve means for moving the valve means,
   g. thermal-sensing means subjecting one side of the motor element to a pressure that is a function of the temperature of the refrigerant at the evaporator outlet and tending to move the valve means to an open position,
   h. means subjecting the other side of the motor element to a pressure of the refrigerant at some point of the system and tending to move the valve means to the closed position, and
   i. the valve means including:
      1. a piston movably mounted in the cylinder,
      2. a first plastic seal carried by the piston and slidably yet sealably engaging the wall of the cylindrical chamber,
      3. a second plastic seal carried by the piston and selectively engaging the valve seat to close the valve port,
      4. opposed first and second pressure surfaces on the piston, the first pressure surface being defined by the valve port and subjected to the pressure in the valve passage at one side of the valve port, and tending to move the valve means toward the open position, and
      5. means subjecting the second pressure surface to the same pressure exerted on the first pressure surface and tending to urge the valve means toward the closed position.

2. In a refrigeration system as defined in claim 1, in which:
   j. the opposed first and second pressure surfaces on the piston having areas to provide a substantially pressure-balanced piston.

3. In a refrigeration system as defined in claim 2, in which:
   k. the means subjecting the said other side of the motor element to a pressure of the refrigerant at some point of the system is an external tube communicating the said other side of the motor element with the system downstream of the valve outlet, the piston remaining pressure-balanced even if a pressure drop occurs between the valve outlet and the external tube connection to the system.

4. In a refrigeration system as defined in claim 1, in which:
   j. the piston includes a nose constituting at least a part of the first pressure surface, the nose extending beyond the second plastic seal and through the valve port, and
   k. the nose is selectively shaped and contoured to vary the nominal capacity of the valve.

5. In a refrigeration system as defined in claim 4, in which:
   l. the piston nose is detachably connected to the piston so that noses of different shapes and contours can be selectively attached to the piston to change the nominal capacity of the valve.

6. In a refrigeration system as defined in claim 4, in which:

l. the piston includes adjacent first and second piston bodies, m. the first plastic seal is located against one end of the first body, n. the second plastic seal is sandwiched between the other end of the first piston body and the second piston body, and o. the nose includes a threaded shank threadedly engaging the first and second piston bodies to clamp the piston bodies and seals together.

7. In a refrigeration system as defined in claim 6, in which:

p. the said means subjecting the second pressure surface to a pressure includes a hole extending through the piston nose and shank.

8. In a refrigeration system as defined in claim 6, in which:

p. the piston nose engages and clamps the first plastic seal to the said one end of the first piston body.

9. In a refrigeration system as defined in claim 6, in which:

p. the plastic seals are provided with holes therethrough, q. the piston bodies are provided with threaded bores therethrough axially aligned with the seal holes, and r. the threaded shank extends through the seal holes and is threadedly attached in the threaded bores to draw the piston nose against the first plastic seal and thereby clamp the piston bodies and seals together.

10. In a refrigeration system as defined in claim 6, in which:

p. the plastic seal includes a down-turned peripheral flange sealably yet slidably engaging the wall of the cylindrical chamber, and q. the second piston body is provided with a peripheral recess extending behind the peripheral flange of the second plastic seal for a pressure compartment.

11. In a refrigeration system as defined in claim 3, in which:

j. a push rod extends through a body bore and into the valve passage to operatively interconnect the flexible motor element and the valve means for moving the valve means, k. the valve body includes a guide portion in the valve passage through which the said body bore extends, the guide portion being provided with an annular edge about the body bore and push rod and being spaced from the valve means in the valve passage, l. a seal collar of plastic material slidably yet sealably mounted with a close fit on the push rod between the guide portion and the valve means, and m. a spring means about the push rod urging the seal collar against the annular edge to seal the clearance of the bore between the push rod and guide portion.

12. In a refrigeration system as defined in claim 11, in which:

n. the guide portion is countersunk about the body bore internally of the annular edge so that during normal motion of the valve means, the portion of the push rod that engages the guide portion will not rub also on the seal collar.

13. In a refrigeration system having a compressor, condenser and evaporator operatively interconnected:

a. an expansion valve comprising a body having an inlet and an outlet interconnected by a passage for flow therethrough, the outlet being connected to a line leading to the evaporator, and the outlet being connected to the high pressure side of the system, b. a valve seat defining a valve port in the passage, c. a valve means movably mounted in the body for movement toward or away from the valve seat to control flow through the valve port, d. a spring means tending to urge the valve means toward a closed position, e. a flexible motor element carried by the body, f. a push rod extending through a body bore and operatively interconnecting the flexible motor element and the valve means for moving the valve means, g. a thermal-sensing means subjecting one side of the motor element to a pressure that is a function of the temperature of the refrigerant at the evaporator outlet and tending to move the valve means to an open position, h. means subjecting the other side of the motor element to a pressure of the refrigerant at some point of the system and tending to move the valve means to the closed position, i. the body including a guide portion through which the said body bore extends, the guide portion extending into the valve passage and spaced from the valve means, the guide portion being provided with an annular edge about the body bore and push rod, j. a seal collar of plastic material slidably yet sealably mounted with a close fit on the push rod between the guide portion and the valve means, and k. a spring means about the push rod urging the seal collar against the annular, substantially knife edge to seal the clearance of the body bore between the push rod and the guide portion.

14. In a refrigeration system as defined in claim 13, in which:

l. the guide portion is countersunk about the body bore internally of the annular edge so that during normal motion of the valve means, the portion of the push rod that engages the guide portion will not rub also on the seal collar.

* * * * *